(12) United States Patent
Hoerr

(10) Patent No.: US 10,876,828 B2
(45) Date of Patent: Dec. 29, 2020

(54) TRACKING SYSTEM AND OPTICAL MEASURING SYSTEM FOR DETERMINING AT LEAST ONE SPATIAL POSITION AND ORIENTATION OF AT LEAST ONE MEASUREMENT OBJECT

(71) Applicant: Carl Zeiss Optotechnik GmbH, Neubeuern (DE)

(72) Inventor: Christian Hoerr, Flintsbach am Inn (DE)

(73) Assignee: Carl Zeiss Optotechnik GmbH, Neubeuern (DE)

( * ) Notice: Subject to any disclaimer, the term of this patent is extended or adjusted under 35 U.S.C. 154(b) by 0 days.

(21) Appl. No.: 16/667,711

(22) Filed: Oct. 29, 2019

(65) Prior Publication Data

US 2020/0132435 A1 Apr. 30, 2020

(30) Foreign Application Priority Data

Oct. 29, 2018 (DE) .......................... 10 2018 218 475

(51) Int. Cl.
*G01B 11/00* (2006.01)
*G06T 7/292* (2017.01)

(52) U.S. Cl.
CPC ............ *G01B 11/005* (2013.01); *G06T 7/292* (2017.01); *G06T 2207/10024* (2013.01)

(58) Field of Classification Search
CPC ..... G01B 11/005; G01B 11/002; G01B 11/02; G01B 11/022; G01B 11/024; G01B 11/026; G01B 11/028; G01B 11/03; G01B 11/0608; G01B 11/0691; G01B 11/14; G01C 1/00; G01C 3/00; G01C 3/02; G06T 7/292; G06T 7/97; G06T 7/90; G06T 7/55; G06T 7/586; G06T 7/593; G06T 7/70; G06T 7/80; G06T 2207/10024; G06T 2207/20088; G06T 2207/10028; G06T 2207/10048; G06T 2207/30244; H04N 5/247; H04N 5/225; H04N 5/2251; H04N 5/2254; H04N 5/22541; H04N 5/2258; H04N 9/045; H04N 9/09; H04N 9/093; H04N 9/097
USPC ....... 356/2, 3, 600–624, 625, 388, 390, 402, 356/404–408; 348/42, 43, 46–48, 86, 94, 348/95, 153, 159, 187, 207.1, 211.11,
(Continued)

(56) References Cited

U.S. PATENT DOCUMENTS

2007/0182739 A1 8/2007 Platonov
2010/0239121 A1 9/2010 Meier
(Continued)

OTHER PUBLICATIONS

Harald Wuest et. al., Adaptive Line Tracking with Multiple Hypotheses for Augmented Reality, International Symposium on Mixed and Augmented Reality, 2005, pp. 62-69, IEEE Computer Society, Los Alamitos, California.

*Primary Examiner* — Christina A Riddle
(74) *Attorney, Agent, or Firm* — Falk Ewers; Ewers IP Law PLLC

(57) ABSTRACT

A tracking system for determining at least one spatial position and an orientation of at least one measurement object includes at least three cameras. The at least three cameras are each arranged at different spatial positions. Each of the at least three cameras has at least two color subsystems. Each of the color subsystems has at least one bandpass filter. Each of the bandpass filters of the color subsystems of the respective camera has different passbands.

10 Claims, 3 Drawing Sheets

(58) Field of Classification Search
USPC .... 348/218.1, 234, 262, 263, 266, 272, 273; 382/103
See application file for complete search history.

(56) References Cited

U.S. PATENT DOCUMENTS

| | | |
|---|---|---|
| 2011/0007326 A1 | 1/2011 | Daxauer et al. |
| 2012/0120199 A1 | 5/2012 | Ben Himane |
| 2013/0050410 A1 | 2/2013 | Steinbichler et al. |
| 2014/0148820 A1* | 5/2014 | Ogawa ............... A61B 18/1402 606/130 |
| 2014/0160253 A1* | 6/2014 | Backman .............. G01J 3/2823 250/226 |
| 2014/0267620 A1* | 9/2014 | Bridges ................... G01S 17/66 348/46 |
| 2016/0073104 A1* | 3/2016 | Hillebrand ........... H04N 17/002 348/47 |
| 2017/0258531 A1 | 9/2017 | Bodjanski |
| 2019/0012795 A1* | 1/2019 | Dai ........................ G06T 7/248 |

* cited by examiner

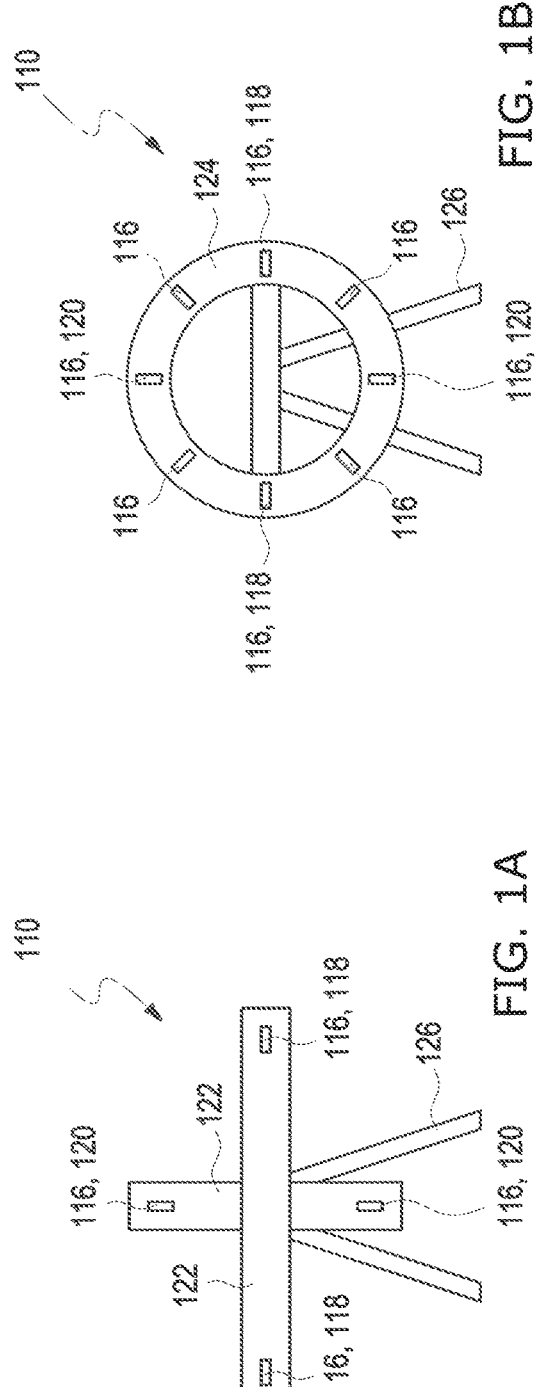
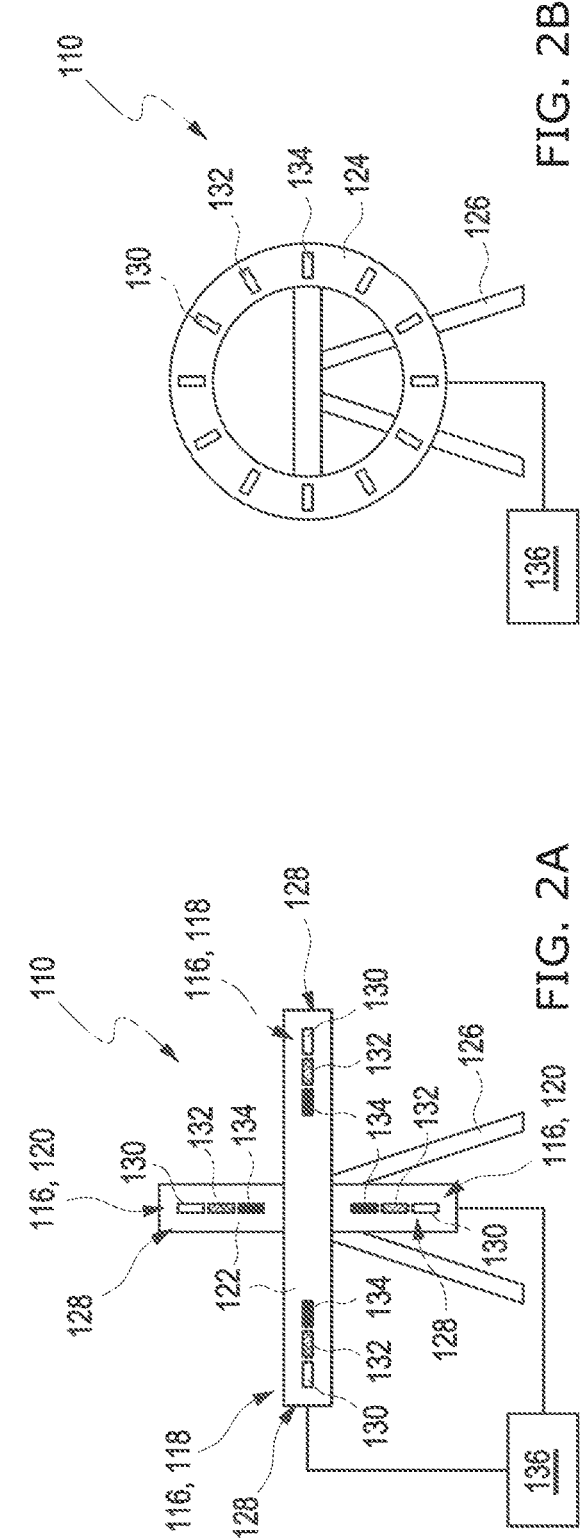

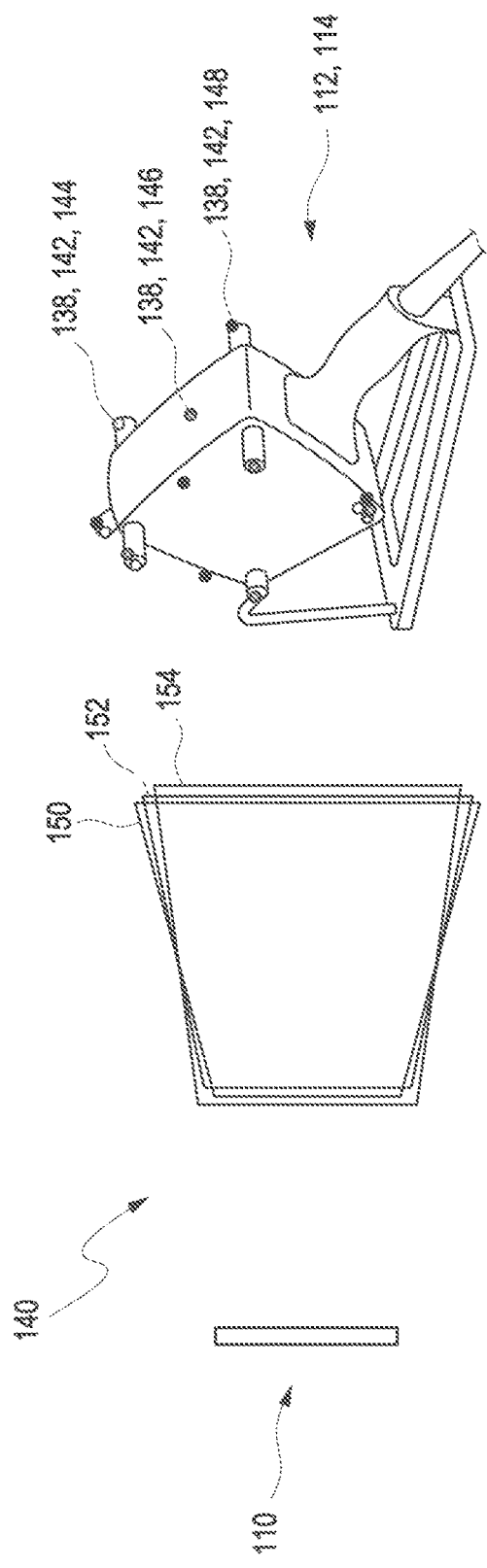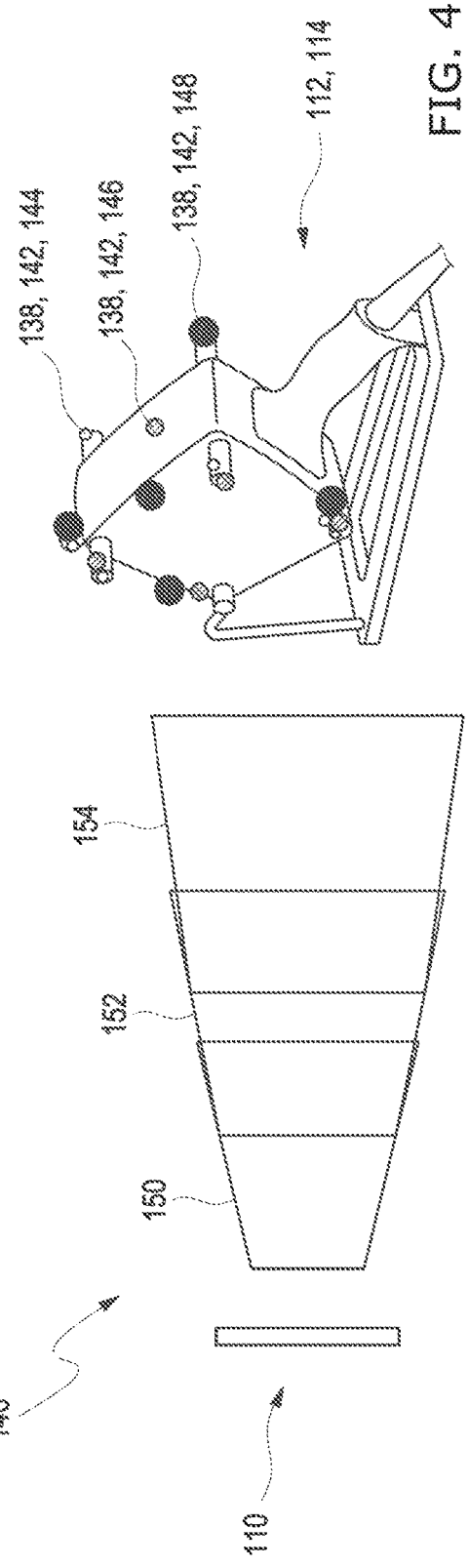

TRACKING SYSTEM AND OPTICAL MEASURING SYSTEM FOR DETERMINING AT LEAST ONE SPATIAL POSITION AND ORIENTATION OF AT LEAST ONE MEASUREMENT OBJECT

CROSS REFERENCE TO RELATED APPLICATIONS

This application claims priority to German patent application DE 10 2018 218 475.5, filed Oct. 29, 2018, the entire content of which is incorporated herein by reference.

TECHNICAL FIELD

The disclosure relates to a tracking system and an optical measuring system for determining at least one spatial position and orientation of at least one measurement object. In particular, the present disclosure relates to the field of coordinate measuring technology for measuring large-volume components.

BACKGROUND

In the field of measuring large volume components, a component is usually scanned by a manually guided or robot-guided scanner or probe, and a position and alignment of the scanner or probe is determined by an optical or mechanical tracker. By way of example, ZEISS has disclosed optical trackers, in particular the optical trackers T-TRACK CS+ and T-TRACK LV.

Further, measuring methods are known, in which a measuring head of a sensor probes a component and the measuring head is positioned and aligned in a measurement volume by a distance measuring apparatus and an additional angle measuring apparatus. Such apparatuses allow a high accuracy; however, the manufacture of such apparatuses with a desired high accuracy is complicated and leads to high costs.

SUMMARY

It is therefore an object of the present disclosure to provide a tracking system and an optical measuring system for determining at least one spatial position and orientation of at least one measurement object, which at least largely avoid the disadvantages of known apparatuses and methods. In particular, at least one spatial position and orientation of at least one measurement object should be determined with low production costs, a high accuracy and less complexity.

The object is achieved by a tracking system and an optical measuring system as described herein.

Hereinafter the terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. By way of example, the expression "A exhibits B", "A has B", "A comprises B" or "A includes B" can refer either to the situation in which, apart from B, no further element is present in A (i.e., to a situation in which A exclusively consists of B), or to the situation in which, in addition to B, one or more further elements are present in A, for example element C, elements C and D or even further elements.

Furthermore, it is pointed out that the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the disclosure, as will be recognized by a person skilled in the art, can also be carried out using other configurations. Similarly, features introduced by "in one embodiment of the disclosure" or by "in one exemplary embodiment of the disclosure" are understood as optional features, without alternative configurations or the scope of protection of the independent claims thereby being intended to be restricted. Furthermore, all possibilities of combining the features introduced by these introductory expressions with other features, whether optional or non-optional features, are intended to remain unaffected by said introductory expressions.

In a first aspect of the present disclosure, a tracking system for determining at least one spatial position and orientation of at least one measurement object is provided.

Within the scope of the present disclosure, a "system" can be understood to mean an apparatus that comprises at least two elements, more particularly a plurality of elements. The elements of the system can be connected to one another in a reversible or fixed fashion. In particular, the elements of the system can interact. A tracking system can be understood to mean an apparatus configured to determine, in particular track, a spatial position and orientation of the measurement object. The tracking system can be configured to track the measurement object. "Tracking" can be understood to mean following a movement of the measurement object at various times.

The spatial position and the orientation can be determined in a coordinate system, for example in a Cartesian coordinate system or in a spherical coordinate system. Other coordinate systems are also conceivable. An origin or zero of the coordinate system can be at a point of the apparatus. A spatial position can be understood to mean a three-dimensional point (X, Y, Z) in the coordinate system, in particular a position of the measurement object. An orientation can be understood to mean an alignment of the measurement object, in particular a rotation in the measurement volume. The orientation can be specified by at least three angles, for example a Euler angle or inclination angle, a roll angle and a yaw angle.

A measurement object in the context of the present disclosure can be understood to mean an object to be measured, in particular tracked, that has any shape. By way of example, the measurement object can be a 3D measuring device, for example a hand-guided scanner or hand-guided probe, by which a component can be probed. By way of example, the 3D measuring device can be a hand scanner, for example a hand scanner obtainable as T-SCAN by ZEISS. By way of example, the 3D measuring device can be a probe, for example a probe obtainable as T-POINT by ZEISS. Alternatively, exemplary embodiments in which the measurement object itself may be completely passive are conceivable.

The measurement object, more particularly the 3D measuring device, may include a plurality of markers. The measurement object may have at least three markers. The measurement object may have four, five, six or more than ten markers, for example 35 markers or more. The markers can be configured as active markers that are configured to emit a light beam. The measurement object, more particularly the 3D measuring device, may include at least one illumination apparatus that is configured to produce the plurality of markers on a surface of the measurement object. The illumination apparatus can have at least one light source. Each marker may include an illumination apparatus, for example at least one LED. The markers can emit a light beam continuously or discontinuously. By way of example, the markers can be configured to emit the light beam with a predeterminable or predetermined frequency. The illumination apparatus can have a modulation apparatus that is configured to provide the light beam produced by the light source with at least one modulation frequency. The light beams emitted by the markers can have different wavelengths. In particular, the emitted light beams can have wavelengths in the near infrared range. This can prevent the human eye from being irritated by visible flashes of light. As an alternative or in addition, the measurement object, more particularly the 3D measuring device, may have retroreflectors or other markers, for example at least three retroreflectors. The measurement object may be illuminated by an external light source, for example a light source of the tracker. A retroreflector can be understood to mean an apparatus that reflects an incident light beam. By way of example, the retroreflector can be a marker. By way of example, the retroreflector can be selected from the group consisting of: a cat's eye, spherical lenses with a reflection layer, a marker as described in US 2011/0007326 A1, US 2013/0050410 A1 or US 2017/0258531 A1, the content of which is herewith incorporated by reference into this application, a cube prism, and a corner cube. The retroreflectors can be arranged on the measurement object in secured and/or interchangeable fashion. A position of the retroreflectors on the measurement object can be known. The measurement object may have a plurality of retroreflectors, in particular more than three retroreflectors, for example four, five, six, or more retroreflectors.

The tracking system can be configured to track exactly one measurement object with markers of different wavelengths. The tracking system can be configured to carry out color multiplexing. "Color multiplexing" can be understood to mean tracking of a measurement object, within the scope of which the measurement object has markers that emit light at different wavelengths.

The tracking system can be configured to track a plurality of measurement objects in parallel. By way of example, each of the measurement objects can have markers of only one wavelength, with the wavelengths of the measurement objects differing. Then, the measurement objects are distinguished by way of the color of the markers. Thus, two scanners and/or probes can be used simultaneously, for example.

An "illumination apparatus" can be understood to mean an apparatus configured to produce a light beam. In the context of the present disclosure, "light" can be understood to mean electromagnetic radiation in at least one spectral range selected from the visible spectral range, the ultraviolet spectral range and the infrared spectral range. The term visible spectral range encompasses, in principle, a range of 380 nanometers (nm) to 780 nm. The term infrared (IR) spectral range encompasses, in principle, a range of 780 nm to 1000 µm, wherein the range of 780 nm to 1.4 µm is designated as near infrared (NIR), and the range of 15 µm to 1000 µm is designated as far infrared (FIR). The term ultraviolet encompasses, in principle, a spectral range of 100 nm to 380 nm. IR light, that is to say light from the infrared spectral range, is typically used in the context of the present disclosure. The term "light beam" can be understood to mean, in principle, a quantity of light which is emitted and/or radiated in a specific direction.

The tracking system includes at least three cameras. The cameras are each arranged at different spatial positions. The cameras each have at least two color subsystems. The color subsystems each have at least one bandpass filter. The bandpass filters of the color subsystems of the respective camera each have different passbands.

The tracking system includes at least three cameras. By way of example, the cameras can include line cameras and/or area cameras A. "Line camera" can be understood to mean a camera having one light-sensitive line, in particular a line sensor. By way of example, the line cameras can each have a plurality of pixels, which are arranged in a line. By way of example, the line cameras can have charge-coupled device (CCD) sensors or complementary metal-oxide-semiconductor (CMOS) sensors. The tracking system may have a plurality of line cameras, for example three, four, five, six, seven, eight, or else more than ten line cameras. The use of cost-effective line cameras can facilitate a cost-effective manufacture of the tracking system. The use of at least three line cameras can facilitate an increase in the accuracy and robustness of the determination of the position and orientation of the measurement object with otherwise unchanged tracking frequency.

The cameras are each arranged at different spatial positions. By way of example, the cameras can be arranged at a fixed distance from one another. 3D coordinates of the markers can be determined by triangulation as a result of positioning the cameras at various spatial positions. The orientation of the measurement object can be determined from the position of the markers. The arrangement of the markers with respect to one another can be predetermined and/or known in advance and/or determined in advance, for example calibrated. An overdetermined system of equations may arise when calculating the 3D coordinates of the markers as a result of using more than three cameras; said system of equations can be solved by fitting methods including optional weighting. Fitting methods and methods for weighting are known to a person skilled in the art. In the case of N cameras, for example, a base noise reduces proportionally with the variation coefficient $1/\sqrt{N}$. On account of the overdetermination or redundancy, markers that are covered or not decodable in individual cameras can nevertheless be evaluated by means of triangulation. The cameras can be arranged in a plane. The cameras can be twisted relative to one another in relation to an optical axis of the tracking system. The cameras can be arranged relative to one another at arbitrary angles about the optical axis. By way of example, the cameras can be arranged at equal distances about the optical axis in a full circle. By way of example, the tracking system may have two horizontal cameras if line cameras are used, the light-sensitive line of said cameras being aligned substantially horizontally. Substantially horizontal can be understood to mean a horizontal alignment, with deviations of less than 5°, typically of less than 2° and particularly typically of less than 1° from a horizontal being possible. The tracking system may have two vertical cameras, for example, if line cameras are used, the light-sensitive line of said cameras being aligned substantially vertically. Substantially vertical can be understood to mean a vertical alignment, with deviations of less than 5°, typically of less than 2° and particularly typically of less than 1° from a vertical being possible. By way of example, the tracking system may have at least two measurement arms, wherein a first, horizontal measurement arm has the horizontal line cameras and a second, vertical measurement arm has the vertical line cameras. The tracking system may have further line cameras, in particular in addition to the horizontal and vertical line cameras. Thus, the tracking system may have a plurality of line cameras, for example eight line cameras. By way of example, the tracking system can have a ring-shaped area, in which the cameras are arranged at equal or different distances in a circle about a common circle center. Other configurations are also conceivable, however. A bias by preferring a certain spatial direction can be avoided in such arrangements.

The cameras each have at least two color subsystems. By way of example, each camera may have at least three, four or more color subsystems, each with a bandpass filter with a different passband in each case. A "color subsystem" can be understood to mean a region, for example a portion, or a part of the camera that is sensitive to a certain wavelength or a certain wavelength range. A camera may also consist of only one color subsystem in the entirety thereof. By way of example, a color subsystem may include a number of pixels of the respective camera. Here, the various color subsystems of a camera may have the same number or different numbers of pixels. Each color subsystem has at least one bandpass filter. A bandpass filter can be understood to mean a filter that only passes light in a certain wavelength range, the so-called passband. The bandpass filter can be configured to suppress, more particularly block or at least attenuate, wavelengths outside of the passband. The bandpass filters of the color subsystems of the respective camera each have different passbands. The cameras may each have subsystems that operate in different wavelength ranges. By way of example, each camera can have at least one first color subsystem and at least one second color subsystem, wherein the bandpass filter of the first color subsystem is configured to pass light at a first wavelength and wherein the bandpass filter of the second color subsystem is configured to pass light at a second wavelength, wherein the first wavelength and the second wavelength differ. The bandpass filter can have a passband in the near infrared range. By way of example, the first and the second wavelength can be wavelengths in the near infrared range.

The color subsystems can each be configured to produce at least one measurement signal in response to an illumination of the respective color subsystem by at least one light beam that has been passed by the respective bandpass filter and that propagates from the measurement object to the tracking system. A "measurement signal" can be understood to mean an electronic signal. The measurement signal can be dependent on the incident intensity. By way of example, the measurement signal can be an electric current and/or a voltage. The measurement signal can be a continuous or discontinuous signal. Further, the measurement signal can be an analogue signal or a digital signal. The color subsystems of a camera can produce the at least one measurement signal independently of one another. The color subsystems of the respective camera can be configured to produce measurement signals in parallel, more particularly simultaneously or with a time overlap.

The tracking system may have at least one evaluation unit that is configured to evaluate the measurement signals of the color subsystems in parallel and to determine the position and orientation of the measurement object. In this case, an "evaluation unit" can generally be understood to mean an electronic apparatus that is configured to evaluate measurement signals produced by the color subsystems. By way of example, one or more electronic connections between the color subsystems and the evaluation unit can be provided for this purpose. The evaluation unit can include at least one data processing apparatus, for example at least one computer or microcontroller. The data processing apparatus can have one or more volatile and/or non-volatile data memories, wherein the data processing apparatus can be configured for example in terms of programming to actuate the color subsystems. The evaluation unit can furthermore include at least one interface, for example an electronic interface and/or a human-machine interface such as, for example, an input/output apparatus such as a display and/or a keyboard. The evaluation unit can be constructed for example centrally or else in a decentralized manner. Other configurations are also conceivable. The evaluation unit can have at least one A/D converter. The tracking system can be configured to carry out a multiplexing method in order to evaluate the measurement signals. The evaluation unit can be configured to process the measurement signals produced independently and in parallel by the color subsystems and to combine the information therefrom. A parallel evaluation may be possible by using a multiplexing method. The evaluation unit can be configured to determine 3D coordinates of the markers by triangulation.

Each of the color subsystems of the respective camera may have at least one optical unit. The optical units of two color subsystems of the respective camera can have an identical configuration or different configurations. The color subsystems can have identical optical units, more particularly cost-effective standard optical units. "Optical units" can be understood to mean any optical elements, more particularly at least one lens and/or at least one lens system. The color subsystems can substantially cover the same measurement volume. The color subsystems can substantially cover identical measurement volumes, wherein deviations from an identical measurement volume are possible provided a sufficient intersection of the measurement volumes is present. By way of example, a deviation from an identical measurement volume may be due to the devices. A "measurement volume" can be understood to mean a volume within which the position and orientation of the measurement object can be determined. A tracking frequency of the tracking system may correspond to a readout frequency. A color subsystem can be configured in each case to record at least one marker in a single image recording. If three color subsystems are used, it may be possible, for example, to record in parallel three markers with three mutually different wavelengths. A "tracking frequency" can be understood to mean the rate at which repetitions, i.e., the same single image recordings, i.e., single image recordings with identical markers, follow one another in a periodic process. Here, a period may have so many single image recordings that each of the markers has been recorded. By way of example, line cameras can be read at a frequency of 2.8 kHz. In the case of known tracking methods (e.g., 1-of-n code), the tracking frequency reduces proportionally with the number of markers. Thus, the tracking frequency in known tracking methods may only be 80 Hz if, for example, use is made of a measurement object with 35 markers, for example, which are recorded in succession. As a result of measuring and evaluating markers at different wavelengths in parallel, the present disclosure allows a tracking frequency to be multiplied proportionally with respect to the number of color subsystems. The color multiplexing according to the disclosure can allow markers at different wavelengths to be recorded in parallel since markers at different wavelengths can be active simultaneously without influencing one another. If use is made of markers with three different wavelengths, for example, a parallel recording of three markers in each case and a tripling of the tracking frequency may be possible. The color subsystems can further be configured to simultaneously record a plurality of markers per color channel and thus further increase a tracking frequency.

An interpolation error between two periods, so-called frames, can be significantly reduced by a higher tracking frequency. The color subsystems can have different optical units in each case, more particularly dedicated optical units. Each color subsystem can define a dedicated measurement volume. Thus, depending on requirements, an overall measurement volume can be increased both in the direction of an end of the measurement volume near to the tracking system, the so-called near end, and in the direction of a far end of the measurement volume, the so-called far end. Further, this allows smaller measurement volumes to be defined, allowing a reduction in hardware requirements of the optical units and a reduction in development and production costs. Typically, the color subsystems can each have standard optical units. This can avoid the installation of complicated zoom objective lenses. Zoom objective lenses can be expensive to produce and also more difficult to calibrate on account of the movable parts. The evaluation unit can be configured to consolidate measurement results by way of a linear combination in the regions in which the measurement volumes of the color subsystems overlap.

Brightness and size of the markers of the 3D measuring device can be adapted, e.g., a priori, to the respective measurement field defined by the measurement volumes. A size of the marker can be understood to mean a size of the light-emitting surface. A brightness of the marker can be understood to mean an intensity. By way of example, the tracking system may have cameras with three color subsystems in each case, for example a first, a second and a third color subsystem in each case. The first color subsystems can be sensitive to light of markers at a first wavelength. The second color subsystems can be sensitive to light of markers at a second wavelength. The third color subsystems can be sensitive to light of markers at a third wavelength. The first color subsystems can define a first measurement volume in a first near region. The second color subsystems can define a second measurement volume in a mid-region, which is further away than the first measurement volume. The third color subsystems can define a third measurement volume in a far region, which is further away than the second measurement volume. The measurement volumes may overlap, at least in part. The markers with the first wavelength can have a first brightness and a first size. The markers with the second wavelength can have a second brightness and a second size. In particular, the markers with the second wavelength can be brighter and/or larger than the markers with the first wavelength. The markers with the third wavelength can have a third brightness and a third size. In particular, the markers with the third wavelength can be brighter and/or larger than the markers with the second wavelength.

The tracking system can have at least one area camera. The tracking system can have a plurality of area cameras, for example two, three, four, or more area cameras. The area cameras can each include at least one sensor that has a matrix of pixels. Further information about the surroundings and/or the measurement object can be obtained by additional area cameras. Further, area cameras can permit additional tracking methods such as model-based tracking, for example as described in Wuest, Harald; Vial, Florent; Stricker, Didier: Adaptive Line Tracking with Multiple Hypotheses for Augmented Reality In: Institute of Electrical and Electronics Engineers (IEEE): ISMAR 2005: Proceedings of the Fourth IEEE and ACM International Symposium on Mixed and Augmented Reality. Los Alamitos, Calif.: IEEE Computer Society, 2005, pp. 62-69, US 2007/182739 A, US 2010/239121 A or in US 2012/120199, and/or passive markers. The line cameras and area cameras can be mutually independent, decoupled subsystems of the tracking system. The line cameras and area cameras can track with different frequencies and disturbance signals, which can be alternately compensated by way of sensor fusion. Sensor fusion can be understood to mean a bringing together and/or linking of data from the various cameras. This can facilitate a more accurate, robust and comprehensive data recording and simultaneous tracking with active and passive markers. In particular, an increased accuracy, robustness and/or speed can be obtained by way of sensor fusion.

An optical measuring system is provided in accordance with a further aspect of the disclosure. The optical measuring systemincludes at least one tracking system according to any one of the preceding exemplary embodiments or exemplary embodiments described below, and at least one 3D measuring device. The 3D measuring device is configured to determine 3D coordinates of an object to be measured. An object to be measured can be understood to mean any object to be measured, more particularly a component or workpiece. For details and exemplary embodiments with regard to the measuring system, reference is made to the description of the tracking system.

In summary, in the context of the present disclosure, the following exemplary embodiments are typical:

Exemplary Embodiment 1

Tracking system for determining at least one spatial position and orientation of at least one measurement object, wherein the tracking system includes at least three cameras, wherein the cameras are each arranged at different spatial positions, wherein the cameras each have at least two color subsystems, wherein the color subsystems each have at least one bandpass filter, wherein the bandpass filters of the color subsystems of the respective camera each have different passbands.

Exemplary Embodiment 2

Tracking system according to the preceding exemplary embodiment, wherein the cameras includes line cameras and/or area cameras.

Exemplary Embodiment 3

Tracking system according to either of the preceding exemplary embodiments, wherein the color subsystems are each configured to produce at least one measurement signal in response to an illumination of the respective color subsystem by at least one light beam that has been passed by the respective bandpass filter and that propagates from the measurement object to the tracking system, wherein the color subsystems of the respective camera are configured to produce parallel measurement signals, wherein the tracking system has at least one evaluation unit that is configured to evaluate the measurement signals of the color subsystems in parallel and to determine the position and orientation of the measurement object.

Exemplary Embodiment 4

Tracking system according to any one of the preceding exemplary embodiments, wherein the tracking system is configured to carry out a multiplexing method for the purposes of evaluating the measurement signals.

Exemplary Embodiment 5

Tracking system according to any one of the preceding exemplary embodiments, wherein each camera has at least one first color subsystem and at least one second color subsystem, wherein the bandpass filter of the first color subsystem is configured to pass light at a first wavelength and wherein the bandpass filter of the second color subsystem is configured to pass light at a second wavelength, wherein the first wavelength and the second wavelength differ.

Exemplary Embodiment 6

Tracking system according to the preceding exemplary embodiment, wherein the first and the second wavelength are wavelengths in the near infrared range.

Exemplary Embodiment 7

Tracking system according to any one of the preceding exemplary embodiments, wherein each camera has at least three color subsystems, each with a bandpass filter with a respectively different passband.

Exemplary Embodiment 8

Tracking system according to any one of the preceding exemplary embodiments, wherein each of the color subsystems of the respective camera has at least one optical unit, wherein the optical units of two color subsystems of the respective camera have an identical configuration or different configurations.

Exemplary Embodiment 9

Optical measuring system including at least one tracking system according to any one of the preceding exemplary embodiments and at least one 3D measuring device, wherein the 3D measuring device is configured to determine 3D coordinates of an object to be measured.

Exemplary Embodiment 10

Optical measuring system according to the preceding exemplary embodiment, wherein the 3D measuring device is selected from a scanner and a probe.

Exemplary Embodiment 11

Optical measuring system according to any one of the two preceding exemplary embodiments, wherein the 3D measuring device includes at least one illumination apparatus that is configured to produce a plurality of markers on a surface of the 3D measuring device, wherein at least two of the markers have different wavelengths, wherein the wavelengths each lie in a passband of one of the bandpass filters.

Exemplary Embodiment 12

Optical measuring system according to the preceding exemplary embodiment, wherein a brightness and/or size of the markers is adaptable to a measuring field of the respective color subsystem.

BRIEF DESCRIPTION OF THE DRAWINGS

The disclosure will now be described with reference to the drawings wherein:

FIGS. 1A and 1B show schematic illustrations of a tracking system according to exemplary embodiments of the disclosure;

FIGS. 2A and 2B show schematic illustrations of a tracking system according to exemplary embodiments of the disclosure;

FIG. 3 shows a schematic illustration of an optical measuring system according to an exemplary embodiment of the disclosure;

FIG. 4 shows a schematic illustration of an optical measuring system according to a further exemplary embodiment of the disclosure.

DESCRIPTION OF EXEMPLARY EMBODIMENTS

Figure 5:
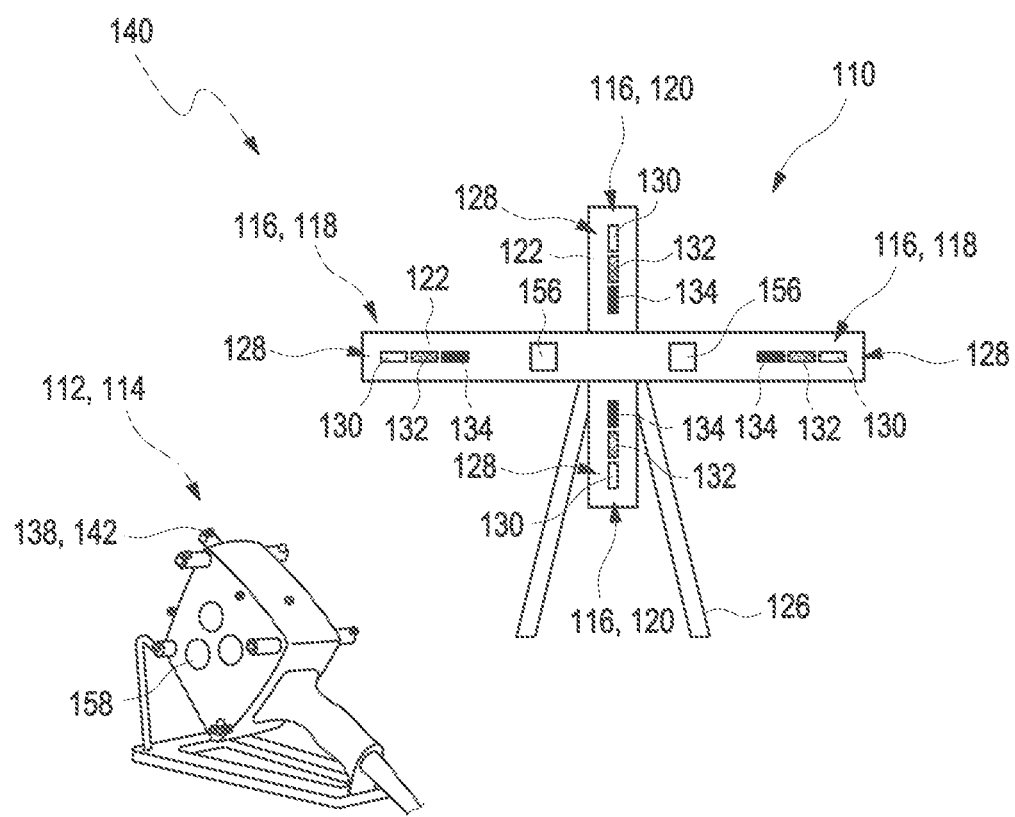
FIG. 5 shows a schematic illustration of a tracking system according to an exemplary embodiment of the disclosure.

Further details and features of the disclosure will become apparent from the following description of exemplary embodiments. The respective features can be realized by themselves or as a plurality in combination with one another. The disclosure is not restricted to the exemplary embodiments. The exemplary embodiments are illustrated schematically in the figures. Identical reference numerals in the individual figures designate identical or functionally identical elements or elements corresponding to one another with regard to their functions FIGS. 1A and 1B show schematic illustrations of exemplary embodiments of a tracking system 110 for determining at least one spatial position and orientation of at least one measurement object 112. The measurement object 112 can be a 3D measuring device 114, for example a hand-guided scanner or hand-guided probe, by which a component can be probed. By way of example, the 3D measuring device 114 can be a hand scanner, for example a hand scanner obtainable as T-SCAN by ZEISS. By way of example, the 3D measuring device 114 can be a probe, for example a probe obtainable as T-POINT by ZEISS. Examples of a 3D measuring device 114 are illustrated in FIGS. 3 to 5.

The tracking system 110 includes at least three cameras 116, which are configured as line cameras in FIGS. 1A and 1B. The cameras 116 can each have a plurality of pixels, which are arranged in a line. The cameras 116 can have CCD sensors or CMOS sensors. The use of cost-effective line cameras can facilitate a cost-effective manufacture of the tracking system. The tracking system 110 may have a plurality of cameras 116, for example four, five, six, seven, eight, or else more than ten cameras. The use of at least three cameras 116 can facilitate an increase in the accuracy and robustness of the determination of the position and orientation of the measurement object 112 without increasing a tracking frequency. The cameras 116 are each arranged at different spatial positions. By way of example, the cameras 116 can be arranged at a fixed distance from one another. The cameras 116 can be arranged in a plane.

FIG. 1A shows an exemplary embodiment in which the tracking system 110 has four cameras 116 that are configured as line cameras. By way of example, the tracking system 110 can have two horizontal line cameras 118, the light-sensitive line of which is aligned substantially horizontally. The tracking system 110 can have two vertical line cameras 120, the light-sensitive line of which is aligned substantially vertically. By way of example, the tracking system 110 may have at least two measurement arms 122, wherein a first, horizontal measurement arm has the horizontal line cameras 118 and a second, vertical measurement arm has the vertical line cameras 120.

The tracking system 110 can have further cameras 116, in particular line cameras, in addition to the horizontal line cameras 118 and vertical line cameras 120, as shown in FIG. 1B. Thus, the tracking system 110 can have, e.g., a plurality of cameras 116, for example eight cameras 116, more particularly eight line cameras. By way of example, the tracking system 110 can have a ring-shaped area 124, in which the cameras 116 are arranged at equal or different distances in a circle about a common circle center. Other configurations are also conceivable, however. A bias by preferring a certain spatial direction can be avoided in such arrangements.

The tracking system 110 can have at least one holding apparatus 126 for fastening the measurement arms 122 or the ring-shaped area 124.

The cameras 116 each have at least two color subsystems 128. By way of example, each camera 116 may have at least three, four or more color subsystems 128, each with a bandpass filter with a different passband in each case. By way of example, a color subsystem 128 may include a number of pixels of the respective camera 116. Here, the various color subsystems 128 of a camera 116 may have the same number or different numbers of pixels. Each color subsystem 128 has at least one bandpass filter. The bandpass filter can be configured to suppress, more particularly block or at least attenuate, wavelengths outside of the passband. The bandpass filters of the color subsystems 128 of the respective camera 116 each have different passbands. The cameras 116 may each have subsystems that operate in different wavelength ranges. FIG. 2A shows a possible configuration for the exemplary embodiment of FIG. 1A. The cameras 116 can each have three color subsystems 128, wherein the bandpass filter of the first color subsystem 130 is configured to pass light at a first wavelength, wherein the bandpass filter of the second color subsystem 132 is configured to pass light at a second wavelength, wherein the bandpass filter of the third color subsystem 134 is configured to pass light at a third wavelength, wherein the first, the second and the third wavelength differ. The bandpass filter can have a passband in the near infrared range. By way of example, the first, the second and the third wavelength can be wavelengths in the infrared range.

FIG. 2B shows a possible configuration for the exemplary embodiment of FIG. 1B. In FIG. 2B, the cameras 116 lying opposite to one another in the circle each have identical color subsystems 128. By way of example, the cameras 116 can be arranged in such a way that the first color subsystem 130, the second color subsystem 132 and the third color subsystem 134 are arranged in a clockwise direction.

The color subsystems 128 can each be configured to produce at least one measurement signal in response to an illumination of the respective color subsystem 128 by at least one light beam that has been passed by the respective bandpass filter and that propagates from the measurement object 112 to the tracking system 110. The color subsystems 128 of a camera 116 can produce the at least one measurement signal independently of one another. The color subsystems 128 of the respective camera 116 can be configured to produce measurement signals in parallel, more particularly simultaneously or with a time overlap.

The tracking system 110 may have at least one evaluation unit 136 that is configured to evaluate the measurement signals of the color subsystems 128 in parallel and to determine the position and orientation of the measurement object 112. By way of example, one or more electronic connections between the color subsystems 128 and the evaluation unit 136 can be provided for this purpose. The evaluation unit 136 can include for example at least one data processing apparatus, for example at least one computer or microcontroller. The data processing apparatus can have one or more volatile and/or non-volatile data memories, wherein the data processing apparatus can be configured for example in terms of programming to actuate the color subsystems 128. The evaluation unit 136 can furthermore include at least one interface, for example an electronic interface and/or a human-machine interface such as, for example, an input/output apparatus such as a display and/or a keyboard. The evaluation unit 136 can be constructed for example centrally or else in a decentralized manner. Other configurations are also conceivable. The evaluation unit 136 can have at least one A/D converter. The tracking system 110 can be configured to carry out a multiplexing method in order to evaluate the measurement signals. A parallel evaluation may be possible by using a multiplexing method. The evaluation unit 136 can be configured to determine 3D coordinates of markers 138 of the measurement object 112 by triangulation.

FIG. 3 shows a schematic illustration of an exemplary embodiment of an optical measuring system 140. The optical measuring system 140 includes the tracking system 110, illustrated very schematically in FIG. 3, and a 3D measuring device 114. By way of example, the tracking system 110 can be configured as shown in FIGS. 1A to 2B. The 3D measuring device 114 can have a plurality of markers 142. In FIG. 3, the 3D measuring device 114 has 15 markers 142. The markers 142 can be configured as active markers that are configured to emit a light beam. The 3D measuring device 114 may include at least one illumination apparatus that is configured to produce the plurality of markers 142 on a surface of the 3D measuring device. The illumination apparatus can have at least one light source. Each marker 142 may have an illumination apparatus, for example at least one LED. The markers 142 can emit a light beam continuously or discontinuously. By way of example, the markers 142 can be configured to emit the light beam with a predeterminable or predetermined frequency. The illumination apparatus can have a modulation apparatus that is configured to provide the light beam produced by the light source with at least one modulation frequency. The light beams emitted by the markers 142 can have different wavelengths. In the exemplary embodiment shown in FIG. 3, the markers 114 can emit light at three different wavelengths. At least one first marker 144 can be configured to emit light at a first wavelength. At least one second marker 146 can be configured to emit light at a second wavelength. At least one of the markers 148 can be configured to emit light at a third wavelength. In FIG. 3, the 3D measuring device includes five first markers 144, five second markers 146, and five third markers 148. However, other numbers are also conceivable. The first wavelength, the second wavelength, and the third wavelength can be different wavelengths in the near infrared range. This can prevent the human eye from being irritated by visible flashes of light.

Each of the color subsystems 128 of the respective camera 116 may have at least one optical unit. The optical units of two color subsystems 128 of the respective camera 116 can have an identical configuration or different configurations. The color subsystems 128 can have identical optical units, more particularly cost-effective standard optical units. The first color subsystem 130 can have a first measurement volume 150. The second color subsystem 132 can have a second measurement volume 152. The third color subsystem 134 can have a third measurement volume 154. The first color subsystem 130, the second color subsystem 132 and the third color subsystem 134 can cover substantially the same measurement volume. The color subsystems 128 can substantially cover identical measurement volumes 150, wherein deviations are possible provided a sufficient intersection of the measurement volumes is present. By way of example, a deviation from an identical measurement volume may be due to the devices. A tracking frequency of the tracking system 110 may correspond to a readout frequency. A color subsystem 128 can be configured in each case to record at least one marker 142 in a single image recording. If three color subsystems 128 are used, it may be possible, for example, to record in parallel three markers 142 with three mutually different wavelengths. As a result of measuring and evaluating markers 142 at different wavelengths in parallel, a tracking frequency can be multiplied proportionally with respect to the number of color subsystems. An interpolation error between two periods of individual recordings, so-called frames, can be significantly reduced by a higher tracking frequency.

FIG. 4 shows a further exemplary embodiment of an optical measuring system 140. The color subsystems 128 can have different optical units in each case, more particularly dedicated optical units. Each color subsystem 128 can define a dedicated measurement volume 150, 152, and 154. FIG. 4 shows successive and partly overlapping measurement volumes 150, 152, and 154. Thus, depending on requirements, an overall measurement volume can be increased both in the direction of an end of the measurement volume near to the tracking system 110, the so-called near end, and in the direction of a far end of the measurement volume, the so-called far end. Further, this allows smaller measurement volumes to be defined, allowing a reduction in hardware requirements of the optical units and a reduction in development and production costs. Typically, the colour subsystems 128 can each have standard optical units. This can avoid the installation of complicated zoom objective lenses. The evaluation unit 136 can be configured to consolidate measurement results by way of a linear combination in the regions in which the measurement volume of the color subsystems overlap. Brightness and size of the markers 142 can be adapted, e.g., a priori, to the respective measurement field defined by the measurement volumes 150, 152, and 154. By way of example, the tracking system 110 can be configured as shown in FIGS. 1A to 2B. The first color subsystems 130 can be sensitive to light of the first markers 144. The second color subsystems 132 can be sensitive to light of second markers 146. The third color subsystems 134 can be sensitive to light of third markers 148. The first color subsystems 132 can define the first measurement volume 150 in a first near region. The second color subsystems 132 can define the second measurement volume 152 in a mid-region, which is further away than the first measurement volume 150. The third color subsystems 134 can define the third measurement volume 156 in a far region, which is further away than the second measurement volume 154. The measurement volumes 150, 152, and 154 may overlap, at least in part. The first markers 144 can have a first brightness and a first size. The second markers 146 can have a second brightness and a second size. In particular, the second markers 146 can be brighter and/or larger than the first markers 144. The third markers 148 can have a third brightness and a third size. In particular, the third markers 148 can be brighter and/or larger than the second markers 146.

FIG. 5 shows an exemplary embodiment in which the tracking system 110 has two area cameras 156. The tracking system 110 can have a plurality of area cameras 156, for example two, three, four, or more area cameras 156. The area cameras 156 can each include at least one sensor that has a matrix of pixels. Further information about the surroundings and/or the measurement object 112 can be obtained by additional area cameras 156. Further, area cameras 156 can permit additional tracking methods such as model-based tracking and/or passive markers. The 3D measuring device 114 can have retroreflectors 158 or other passive markers, for example at least three retroreflectors 158. The retroreflectors 158 can be arranged in secured and/or interchangeable fashion. A position of the retroreflectors 158 on the measurement object 112 can be known. The line cameras and area cameras 156 can be mutually independent, decoupled subsystems of the tracking system 110. The line cameras and area cameras 156 can track with different frequencies and disturbance signals, which can be alternately compensated by way of sensor fusion. This can facilitate a more accurate, robust and comprehensive data recording and simultaneous tracking with active and passive markers. In particular, an increased accuracy, robustness and/or speed can be obtained by way of sensor fusion.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

110 Tracking system
112 Measurement object
114 3D measuring device
116 Camera
118 Horizontal line camera
120 Vertical line camera
122 Measurement arm
124 Area
126 Holding apparatus
128 Color subsystem
130 First color subsystem
132 Second color subsystem
134 Third color subsystem
136 Evaluation unit
140 Optical measuring system
142 Marker
144 First marker
146 Second marker
148 Third marker
150 First measurement volume
152 Second measurement volume 154 Third measurement volume
156 Area camera
158 Retroreflector

What is claimed is:

1. A tracking system for determining at least one spatial position and an orientation of at least one measurement object, the tracking system comprising:
at least three cameras, each of the at least three cameras:
being arranged at different spatial positions, and
having at least two color subsystems,
each of the at least two color subsystems having at least one bandpass filter and being configured to produce measurement signals, and
each of the at least one bandpass filter of the at least two color subsystems having different passbands; and
at least one evaluation unit configured to:
evaluate the measurement signals of the at least two color subsystems in parallel,
determine the at least one spatial position and the orientation of the at least one measurement object, and
consolidate measurement results by a linear combination in regions in which measurement volumes of the at least two color subsystems overlap, and
wherein the at least one measurement object is at least one 3D measuring device.

2. The tracking system according to claim 1, wherein the at least three cameras include line cameras and/or area cameras.

3. The tracking system according to claim 1, wherein:
each of the at least two color subsystems is configured to produce at least one measurement signal in response to an illumination of a respective color subsystem of the at least two color subsystems by at least one light beam that has been passed by a respective bandpass filter of the at least one bandpass filter and that propagates from the at least one measurement object to the tracking system,
the at least two color subsystems of a respective camera of the at least three cameras are configured to produce parallel measurement signals, and
the at least one evaluation unit is further configured to evaluate the parallel measurement signals of the at least two color subsystems in parallel and to determine the at least one spatial position and the orientation of the at least one measurement object.

4. The tracking system according to claim 1, wherein:
each of the at least three cameras has at least one first color subsystem and at least one second color subsystem,
a first bandpass filter of the at least one first color subsystem is configured to pass light of a first wavelength,
a second bandpass filter of the at least one second color subsystem is configured to pass light of a second wavelength, and
the first wavelength and the second wavelength differ from one another.

5. The tracking system according to claim 4, wherein the first and second wavelengths are wavelengths in a near infrared range.

6. The tracking system according to claim 1, wherein:
each of the at least three cameras has at least three color subsystems, and
each of the at least three color subsystems includes the at least one bandpass filter with a respectively different passband.

7. The tracking system according to claim 1, wherein:
each of the at least two color subsystems of a respective camera of the at least three cameras has at least one optical unit, and
each of the at least one optical unit of the at least two color subsystems of the respective camera has an identical configuration or different configurations.

8. An optical measuring system comprising:
at least one tracking system according to claim 1; and
the at least one 3D measuring device being configured to determine 3D coordinates of an object to be measured.

9. The optical measuring system according to claim 8, wherein the at least one 3D measuring device is selected from a scanner and a probe.

10. The optical measuring system according to claim 8, wherein:
the at least one 3D measuring device includes at least one illumination apparatus configured to generate a plurality of markers on a surface of the at least one 3D measuring device,
at least two of the plurality of markers have different wavelengths,
the different wavelengths each lie in a passband of one of the at least one bandpass filter, and
a brightness and/or a size of the plurality of markers is adaptable to a measuring field of a respective color subsystem.

* * * * *